(12) United States Patent
Ravimohan et al.

(10) Patent No.: US 12,423,180 B1
(45) Date of Patent: Sep. 23, 2025

(54) DATA STORAGE DEVICE AND METHOD FOR APPLICATION-DEFINED EXTENDED DATA RECOVERY

(71) Applicant: Sandisk Technologies, Inc., Milpitas, CA (US)

(72) Inventors: Narendhiran Chinnaanangur Ravimohan, Bangalore (IN); Ramanathan Muthiah, Bangalore (IN); Meenakshi C, Bangalore (IN)

(73) Assignee: Sandisk Technologies, Inc., Milpitas, CA (US)

( * ) Notice: Subject to any disclaimer, the term of this patent is extended or adjusted under 35 U.S.C. 154(b) by 44 days.

(21) Appl. No.: 18/613,385

(22) Filed: Mar. 22, 2024

(51) Int. Cl.
  *G06F 11/10* (2006.01)
  *G06F 12/02* (2006.01)
  *G06F 12/0802* (2016.01)
(52) U.S. Cl.
  CPC ...... *G06F 11/1064* (2013.01); *G06F 12/0246* (2013.01); *G06F 12/0802* (2013.01)
(58) Field of Classification Search
  CPC ............. G06F 11/1064; G06F 12/0246; G06F 12/0802
  See application file for complete search history.

(56) References Cited

U.S. PATENT DOCUMENTS

| | | | |
|---|---|---|---|
| 8,176,015 B1 | 5/2012 | Somerville | |
| 8,549,236 B2 | 10/2013 | Diggs et al. | |
| 9,507,543 B2 | 11/2016 | Sutardja et al. | |
| 11,789,616 B2 | 10/2023 | Ravimohan et al. | |
| 2014/0258658 A1 | 9/2014 | Best et al. | |
| 2016/0077975 A1* | 3/2016 | Stabrawa | H04L 67/1097 711/209 |
| 2020/0110700 A1* | 4/2020 | Shi | G06F 12/0897 |
| 2022/0317903 A1* | 10/2022 | Stabrawa | G06F 3/0604 |
| 2024/0330179 A1* | 10/2024 | Wang | G06F 12/0802 |

\* cited by examiner

*Primary Examiner* — Michael Maskulinski
*Assistant Examiner* — Kayo Lisa Rusin
(74) *Attorney, Agent, or Firm* — Crowell & Moring LLP

(57) ABSTRACT

In one embodiment, a data storage device comprises a memory and one or more processors. The one or more processors, individually or in combination, are configured to: provide a host with an indication of an amount of data to cache in a memory of the host; receive, from the host, the amount of data for storage in the memory of the data storage device, wherein the host is configured to cache the amount of data in the memory of the host as a secondary copy; and write only a single copy of the amount of data in the memory of the data storage device, wherein the secondary copy stored in the memory in the host is available in an event of a failure to correctly write the single copy in the memory of the data storage device. Other embodiments are provided.

20 Claims, 7 Drawing Sheets

DATA STORAGE DEVICE AND METHOD FOR APPLICATION-DEFINED EXTENDED DATA RECOVERY

BACKGROUND

When writing data to memory, some data storage devices write two copies of the data. One copy of the data is written in a primary block, and another copy of the data is written (e.g., in parallel) in a secondary block. After the data has been written, a data verification process, such as an enhanced post-write read (EPWR), is used to verify that the data was correctly written in the primary block. If the data was correctly written in the primary block, the secondary block can be released and reused for other writes. In this situation, the copy of the data written in the secondary block was a temporary backup of the data stored in the primary block. However, if the data verification process reveals that the data was not correctly written in the primary block, the data storage device commits the data written in the secondary block. In this situation, using the secondary block to store a copy of the data ensured that the data was not compromised due to a memory failure in the primary block.

DETAILED DESCRIPTION

Figure 1A:
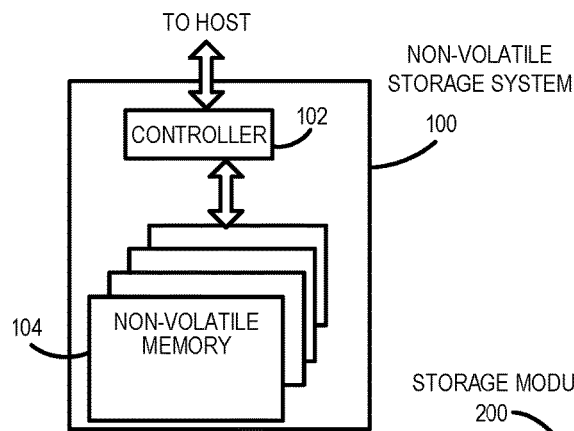
FIG. 1A is a block diagram of a data storage device of an embodiment.

The following embodiments generally relate to a data storage device and method for application-defined extended data recovery. In one embodiment, a data storage device is provided comprising a memory and one or more processors. The one or more processors, individually or in combination, are configured to: provide a host with an indication of an amount of data to cache in a memory of the host; receive, from the host, the amount of data for storage in the memory of the data storage device, wherein the host is configured to cache the amount of data in the memory of the host as a secondary copy; and write only a single copy of the amount of data in the memory of the data storage device, wherein the secondary copy stored in the memory in the host is available in an event of a failure to correctly write the single copy in the memory of the data storage device.

In some embodiments, the indication comprises a data size of a write verification process.

In some embodiments, the indication is based on a margin of the data storage device, a quality-of service requirement, a memory node, a memory configuration, and/or a backend need of the data storage device.

In some embodiments, the one or more processors, individually or in combination, are further configured to provide the host with computer-readable program instructions that, when executed by the host, provide an application configured to receive the indication from the data storage device and cause the amount of data to be cached.

In some embodiments, the one or more processors, individually or in combination, are further configured to provide the host with computer-readable program instructions for a driver that is configured to receive the indication from the data storage device and cause the amount of data to be cached.

In some embodiments, the one or more processors, individually or in combination, are further configured to dynamically change the amount of data to cache in the memory of the host.

In some embodiments, the one or more processors, individually or in combination, are further configured to disable program-fail-specific parity protection in response to the host caching the amount of data in the memory of the host as the secondary copy.

In some embodiments, the host is further configured to refresh the cached amount of data in a first-in-first-out (FIFO) manner for every write, such that last-written data is backed up.

In some embodiments, the memory in the data storage device comprises a three-dimensional memory.

In another some embodiment, a non-transitory computer-readable medium is provided that stores program instructions that, when executed by one or more processors in a host in communication with a data storage device, cause the one or more processors, individually or in combination, to perform functions comprising: receiving, from the data storage device, an indication of how much data to cache in a memory of the host; sending, to the data storage device, data to store in a memory in the data storage device; caching an amount of the data in the memory in the host per the indication; receiving, from the data storage device, a notification of a failure in writing the data in the memory of the data storage device; and in response to receiving the notification, sending, to the data storage device, the data cached in the memory in the host.

In some embodiments, the indication is based on a data size of a write verification process.

In some embodiments, the indication is based on a margin of the data storage device, a quality-of service requirement, a memory node, a memory configuration, and/or a backend need of the data storage device.

In some embodiments, the program instructions are for an application.

In some embodiments, the program instructions are for a driver.

In some embodiments, the indication is dynamically changeable by the data storage device.

In some embodiments, additional program instructions that, when executed by the one or more processors in the host, cause the one or more processors, individually or in combination, to disable parity protection.

In some embodiments, additional program instructions that, when executed by the one or more processors in the host, cause the one or more processors, individually or in combination, to refresh the cached amount of data in a first-in-first-out (FIFO) manner.

In some embodiments, the non-transitory computer-readable medium is in the host; and the program instructions are provided to the non-transitory computer-readable medium from the data storage device.

In some embodiments, the memory in the data storage device comprises a three-dimensional memory.

In yet another embodiment, a data storage device is provided comprising: a memory; and means for enabling a host to store a secondary copy of data in host memory to eliminate a need to store the secondary copy of the data in the memory of the data storage device.

Other embodiments are possible, and each of the embodiments can be used alone or together in combination. Accordingly, various embodiments will now be described with reference to the attached drawings.

Embodiments

The following embodiments relate to a data storage device (DSD). As used herein, a "data storage device" refers to a non-volatile device that stores data. Examples of DSDs include, but are not limited to, hard disk drives (HDDs), solid state drives (SSDs), tape drives, hybrid drives, etc. Details of example DSDs are provided below.

Figure 1B:
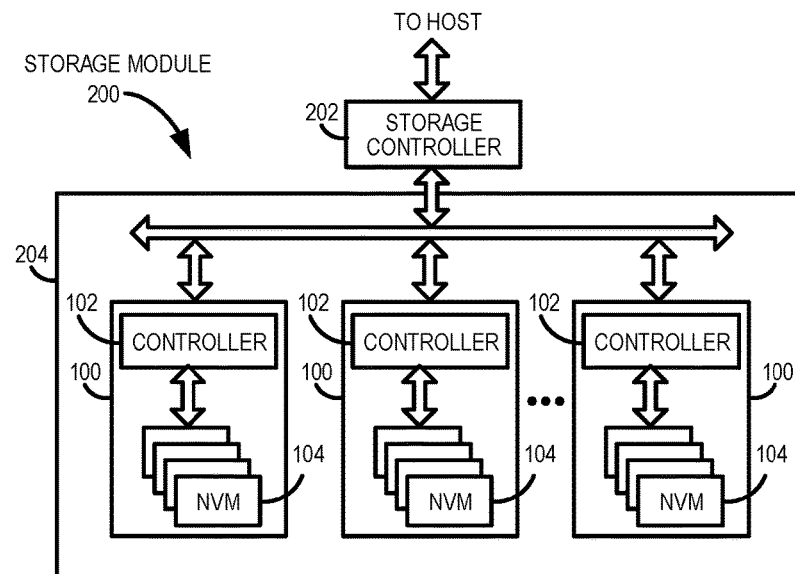
FIG. 1B is a block diagram illustrating a storage module of an embodiment.
Figure 1C:
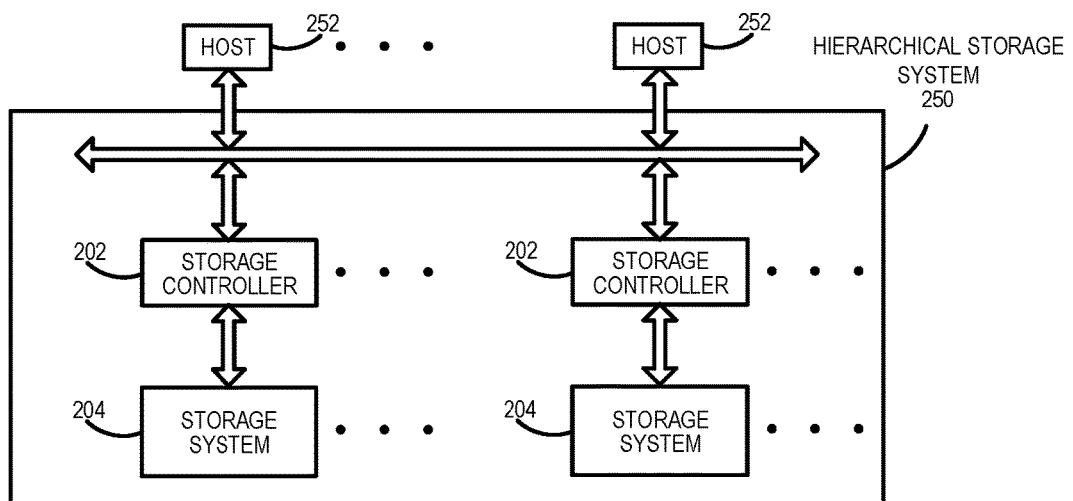
FIG. 1C is a block diagram illustrating a hierarchical storage system of an embodiment.

Examples of data storage devices suitable for use in implementing aspects of these embodiments are shown in FIGS. 1A-1C. It should be noted that these are merely examples and that other implementations can be used. FIG. 1A is a block diagram illustrating the data storage device 100 according to an embodiment. Referring to FIG. 1A, the data storage device 100 in this example includes a controller 102 coupled with a non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. The controller 102 interfaces with a host system and transmits command sequences for read, program, and erase operations to non-volatile memory die 104. Also, as used herein, the phrase "in communication with" or "coupled with" could mean directly in communication/coupled with or indirectly in communication/coupled with through one or more components, which may or may not be shown or described herein. The communication/coupling can be wired or wireless.

Figure 2A:
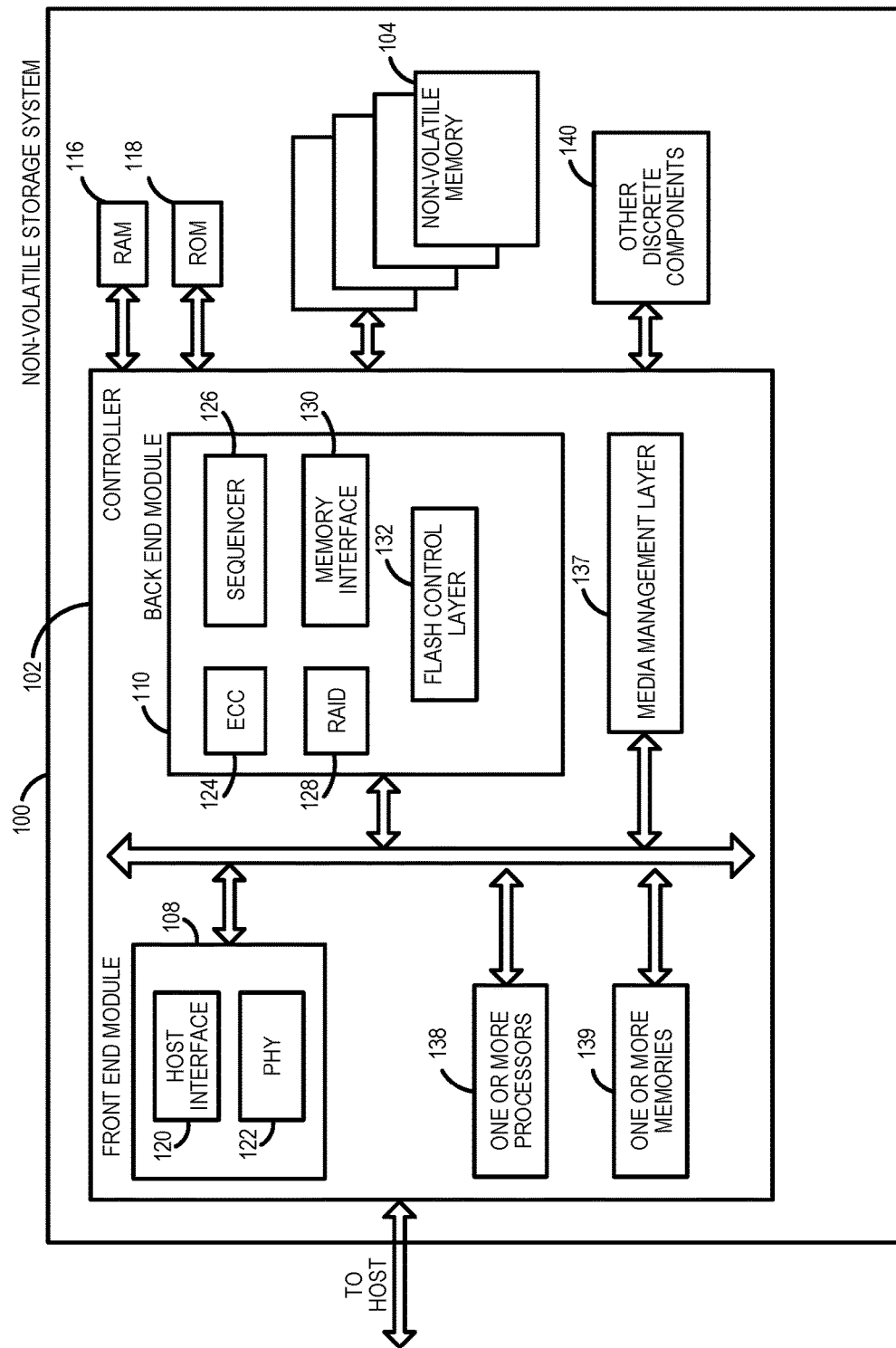
FIG. 2A is a block diagram illustrating components of the controller of the data storage device illustrated in FIG. 1A according to an embodiment.

The controller 102 (which may be a non-volatile memory controller (e.g., a flash, resistive random-access memory (ReRAM), phase-change memory (PCM), or magnetoresistive random-access memory (MRAM) controller)) can include one or more components, individually or in combination, configured to perform certain functions, including, but not limited to, the functions described herein and illustrated in the flow charts. For example, as shown in FIG. 2A, the controller 102 can comprise one or more processors 138 that are, individually or in combination, configured to perform functions, such as, but not limited to the functions described herein and illustrated in the flow charts, by executing computer-readable program code stored in one or more non-transitory memories 139 inside the controller 102 and/or outside the controller 102 (e.g., in random access memory (RAM) 116 or read-only memory (ROM) 118). As another example, the one or more components can include circuitry, such as, but not limited to, logic gates, switches, an application specific integrated circuit (ASIC), a programmable logic controller, and an embedded microcontroller.

In one example embodiment, the non-volatile memory controller 102 is a device that manages data stored on non-volatile memory and communicates with a host, such as a computer or electronic device, with any suitable operating system. The non-volatile memory controller 102 can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware (and/or other metadata used for housekeeping and tracking) to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC) (e.g., dual-level cells, triple-level cells (TLC), quad-level cells (QLC), etc.) or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, the data storage device 100 may be a card-based system, such as a secure digital (SD) or a micro secure digital (micro-SD) card. In an alternate embodiment, the data storage device 100 may be part of an embedded data storage device.

Although, in the example illustrated in FIG. 1A, the data storage device 100 (sometimes referred to herein as a storage module) includes a single channel between controller 102 and non-volatile memory die 104, the subject matter described herein is not limited to having a single memory channel. For example, in some architectures (such as the ones shown in FIGS. 1B and 1C), two, four, eight or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile data storage devices 100. As such, storage module 200 may include a storage controller 202 that interfaces with a host and with data storage device 204, which includes a plurality of data storage devices 100. The interface between storage controller 202 and data storage devices 100 may be a bus interface, such as a serial advanced technology attachment (SATA), peripheral component interconnect express (PCIe) interface, double-data-rate (DDR)

interface, or serial attached small scale compute interface (SAS/SCSI). Storage module 200, in one embodiment, may be a solid-state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective data storage device 204. Host systems 252 may access memories within the storage system 250 via a bus interface. In one embodiment, the bus interface may be a Non-Volatile Memory Express (NVMe) or Fibre Channel over Ethernet (FCoE) interface. In one embodiment, the system illustrated in FIG. 1C may be a rack mountable mass storage system that is accessible by multiple host computers, such as would be found in a data center or other location where mass storage is needed.

Referring again to FIG. 2A, the controller 102 in this example also includes a front-end module 108 that interfaces with a host, a back-end module 110 that interfaces with the one or more non-volatile memory die 104, and various other components or modules, such as, but not limited to, a buffer manager/bus controller module that manage buffers in RAM 116 and controls the internal bus arbitration of controller 102. A module can include one or more processors or components, as discussed above. The ROM 118 can store system boot code. Although illustrated in FIG. 2A as located separately from the controller 102, in other embodiments one or both of the RAM 116 and ROM 118 may be located within the controller 102. In yet other embodiments, portions of RAM 116 and ROM 118 may be located both within the controller 102 and outside the controller 102.

Front-end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back-end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. The controller 102 in this example also comprises a media management layer 137 and a flash control layer 132, which controls the overall operation of back-end module 110.

The data storage device 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
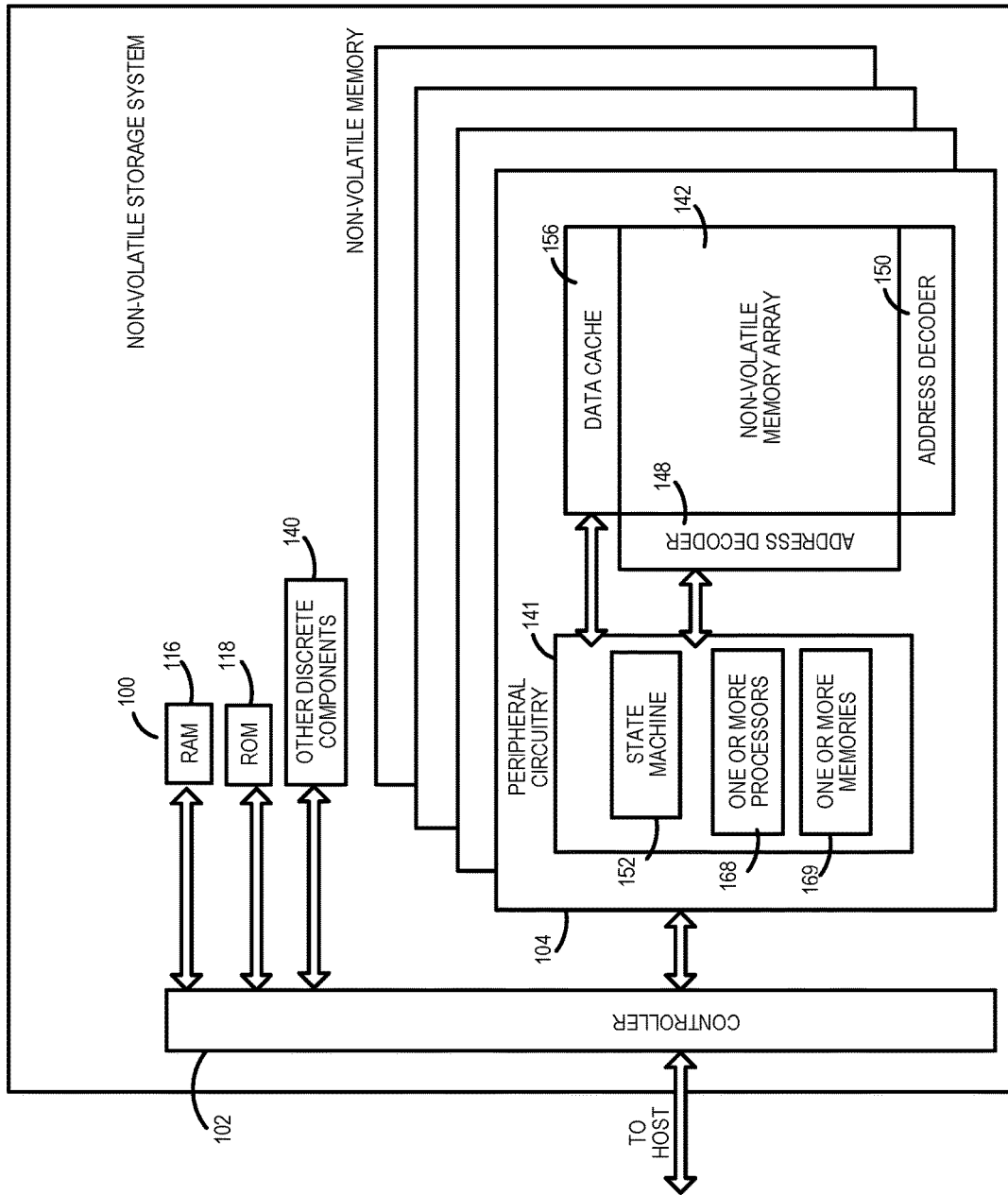
FIG. 2B is a block diagram illustrating components of the data storage device illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two-dimensional and/or three-dimensional configuration. Non-volatile memory die 104 further includes a data cache 156 that caches data. The peripheral circuitry 141 in this example includes a state machine 152 that provides status information to the controller 102. The peripheral circuitry 141 can also comprise one or more components that are, individually or in combination, configured to perform certain functions, including, but not limited to, the functions described herein and illustrated in the flow charts. For example, as shown in FIG. 2B, the memory die 104 can comprise one or more processors 168 that are, individually or in combination, configured to execute computer-readable program code stored in one or more non-transitory memories 169, stored in the memory array 142, or stored outside the memory die 104. As another example, the one or more components can include circuitry, such as, but not limited to, logic gates, switches, an application specific integrated circuit (ASIC), a programmable logic controller, and an embedded microcontroller.

In addition to or instead of the one or more processors 138 (or, more generally, components) in the controller 102 and the one or more processors 168 (or, more generally, components) in the memory die 104, the data storage device 100 can comprise another set of one or more processors (or, more generally, components). In general, wherever they are located and however many there are, one or more processors (or, more generally, components) in the data storage device 100 can be, individually or in combination, configured to perform various functions, including, but not limited to, the functions described herein and illustrated in the flow charts. For example, the one or more processors (or components) can be in the controller 102, memory device 104, and/or other location in the data storage device 100. Also, different functions can be performed using different processors (or components) or combinations of processors (or components). Further, means for performing a function can be implemented with a controller comprising one or more components (e.g., processors or the other components described above).

Returning again to FIG. 2A, the flash control layer 132 (which will be referred to herein as the flash translation layer (FTL) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may be written in only multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
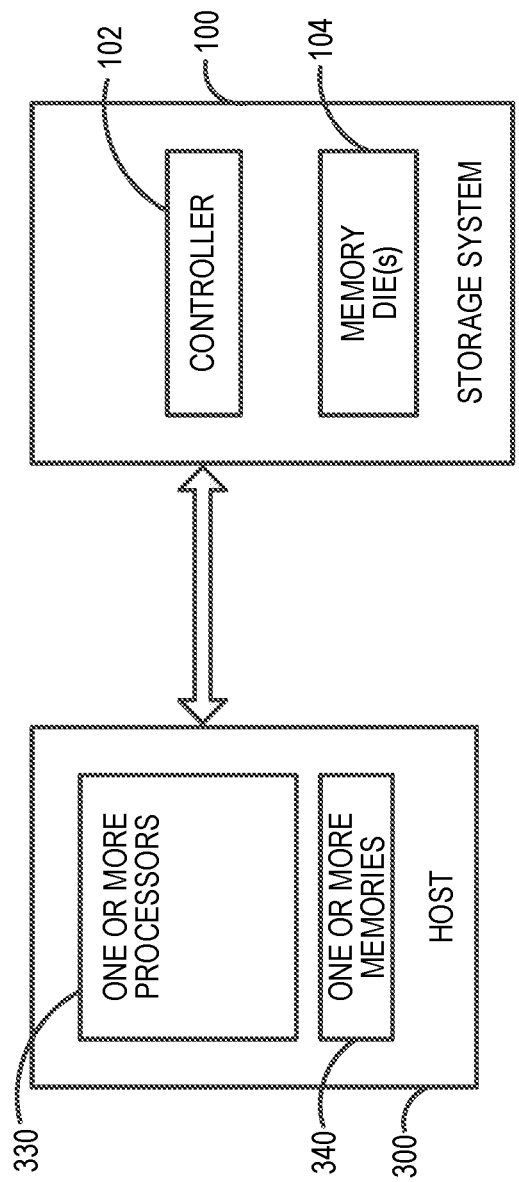
FIG. 3 is a block diagram of a host and a data storage device of an embodiment.

Turning again to the drawings, FIG. 3 is a block diagram of a host 300 and data storage device 100 of an embodiment. The host 300 can take any suitable form, including, but not limited to, a computer, a mobile phone, a tablet, a wearable device, a digital video recorder, a surveillance system, etc. The host 300 in this embodiment (here, a computing device) comprises one or more processors 330 and one or more memories 340. In one embodiment, computer-readable program code stored in the one or more memories 340 configures the one or more processors 330 to perform the acts described herein as being performed by the host 300. So, actions performed by the host 300 are sometimes referred to herein as being performed by an application (computer-readable program code) run on the host 300. For example, the host 300 can be configured to send data (e.g., initially stored in the host's memory 340) to the data storage device 100 for storage in the data storage device's memory 104.

As mentioned above, when writing data to memory, some data storage devices write two copies of the data. One copy of the data is written in a primary block, and another copy of the data is written (e.g., in parallel) in a secondary block. After the data has been written, a data verification process, such as an enhanced post-write read (EPWR) process, is used to verify that the data was correctly written in the primary block. If the data was correctly written in the primary block, the secondary block can be released and reused for other writes. In this situation, the copy of the data written in the secondary block was a temporary backup of the data stored in the primary block. However, if the data verification process reveals that the data was not correctly written in the primary block, the data storage device commits the data written in the secondary block. In this situation, using the secondary block to store a copy of the data ensured that the data was not compromised due to a memory failure in the primary block.

The use of secondary backup blocks has its own limitations, such as an impact on the block budget and yield due to additional blocks allotted for backup other than the required capacity blocks, as well as performance due to the dual writes doubling the amount of required data writes. With higher memory nodes with larger block sizes, the cost impact due to the increased block budget will be greater and can be a challenge to meeting higher performance requirements in the future. A rolling data verification scheme can be used to phase data verification and release secondary blocks faster, which can reduce the number of secondary blocks held in reserve to improve block budget/yield.

The following embodiments present another way to address these issues by replacing the secondary backup blocks with a reliable backup outside the data storage device for yield and performance benefits over the long term. In one example implementation (other implementations are possible), computer-readable program instructions are provided to the host 300 for execution by its one or more processors 330. In one embodiment, the computer-readable program instructions are stored in the data storage device 100 (e.g., in its non-volatile memory 104) and provided to the host 300. In other embodiments, the computer-readable program instructions are provided to the host 300 another way (e.g., by downloading the computer-readable program instructions from a network, by being installed in the host 300 by its manufacturer, etc.).

As will be described in more detail below, the computer-readable program instructions, when executed by the one or more processors 330 in the host 300, can support extended error recovery in the data storage device 100 by caching/holding, in the one or more memories 340 (e.g., in DRAM or another type of volatile memory) in the host 300, a portion ("chunk") of host data for a data-storage-device-chosen amount (e.g., block-size) of data, as decided dynamically by the controller 102 in the data storage device 100, on which an error can happen.

The computer-readable program instructions can take any suitable form. In one example implementation, the computer-readable program instructions take the form of an application (an "app"), which is a piece of software that executes of top of the host's operating system to communicate with the data storage device. In this way, the application can act as a third-party interface between the host 300 and the data storage device 100. The application can be a dedicated application that has full integration with the data storage device's primary purpose (e.g., the application can have knowledge about the type of memory 104 in the data storage device 100 and the caching requirements appropriate for that memory type).

In another example implementation, the computer-readable program instructions take the form of a driver (e.g., a storage driver) that allows the host's operating system to directly communicate with the data storage device 100. The driver can run in the host 300, use host resources, and have intelligence associated with it as determined and set by the data storage device 100. In one example implementation, the driver can be added to Linux and Windows storage stacks and can be standardized and implemented in open source.

In the following example, the computer-readable program instructions take the form of an application that is provided to the host 300 by the data storage device 100, but this should not be read as a limitation on the claims, as other implementations are possible. In this example, the application supports extended error recovery in the data storage device 100 by caching/holding, in the one or more memories 340 (e.g., in DRAM or another type of volatile memory) in the host 300, a portion ("chunk") of host data for a data-storage-device-chosen amount (e.g., block-size) of data, as decided dynamically by the controller 102 in the data storage device 100, on which an error can happen. The host memory used for this purpose can be, but does not have to be, hidden from the rest of the operating system stack, such as when the application does not allow direct interaction with the host's file system.

It should be noted that this is different from the generic situation in which a host contains write buffers to store data sent to a data storage device. For example, in some storage environments, a host can hold write commands and not complete them until they were verified. That is, the host can wait to release its write buffers until it gets a completion message from the data storage device, and the data storage device can restart writes internally if needed. In other storage environments, a host can cache non-critical writes and coalesce them (with critical writes being flushed immediately) and provide specific ordering and checkpointing to maintain file system consistency. However, in these storage environments, the size of such write buffers is fixed and not determined by the data storage device.

In contrast to the fixed-sized caching discussed above, in this embodiment, the controller 102 determines and communicates the amount of host data caching that the application performs based on, for example, the backend routing and memory verification design. For example, the amount of data to be cached can depend on the data storage device's margin. The host 300 can support higher caching if required (e.g., in the range of a few kilobytes to hundreds of megabytes depending on the memory node). Fallback options can be enabled for different quality-of-service requirements in the data storage device's firmware. The system can be made backward compatible wherein when the host 300 cannot support the protocol, the controller 102 in the data storage device 100 can manage the errors internally trading off with quality of service. In short, the controller 102 and the application can work hand-in-hand to help ensure the data that is prone to program failure is also sufficiently buffered at the host side until the controller 102 can verify that the data was written correctly in the memory 104 of the data storage device 100. Hence, based on the memory node and the memory system configuration, the amount of data can vary, and the application can use this information at the host side to cache that amount of data.

Likewise, the application, which can act as a middle layer between the host 300 and the data storage device 100, can cache write data and decide whether to let go or re-route the data back to the data storage device 100 based on whether the initial program writes were successful in the backend memory 104. For example, if there are six wordlines until which the write verification cannot be done as per device firmware design, the application can be instructed to cache six wordline's worth of data (or an equivalent absolute number of bytes) as a backup mechanism. Thus, in every load (or a certain number of loads), the controller 102 can dynamically modify the application's behavior (e.g., cache on/off, amount of caching, etc.) based on backend needs. The application can also be used as an alternative to parity protection in the write recovery path.

Figure 4:
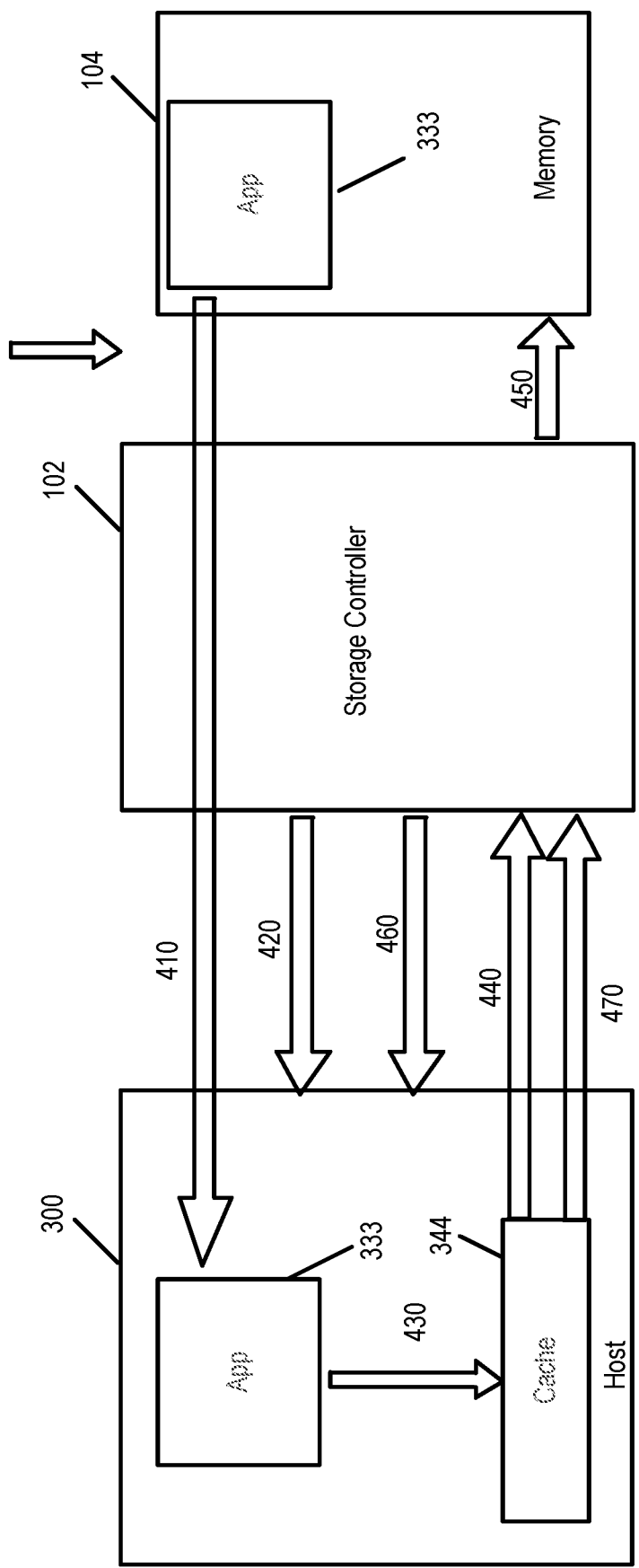
FIG. 4 is a block diagram of a host and a data storage device of an embodiment that illustrates a method for application-defined extended data recovery.

Turning again to the drawings, FIG. 4 illustrates a method for application-defined extended data recovery. As shown by the flow arrows in FIG. 4, in this example, the program instructions for the application 333 are initially as stored in the data storage device's memory 104 and provided to the host 300 (act 410). The host 300 can store the program instructions in its one or more memories 340 and execute the instruction with its one or more processors 330 (see FIG. 3). The program instructions can be sent to the host 300 once or every time the data storage device 100 is connected with the host 300.

Next, the controller 102 (e.g., using the flash translation layer (FTL)) triggers the application 333 executed in the host 300 and sends a data verification block length to the application 333 (act 420). In response, the application 333 stores data in a cache 344 (act 430) (which can be implemented in the one or more memories 340 (e.g., in volatile memory, such as DRAM) in the host 300) and sends the data to the data storage device 100 for storage (act 440). The data is kept in the cache 344 as a backup. The controller 102 in the data storage device 100 then attempts to write the data in the memory 104 (act 450). If the controller 102 encounters an error in writing the data, the controller 102 informs the application 333 on the host 300 (act 460), and the application 333 causes the data to be re-sent from the cache 344 to the data storage device 100 for re-programming (act 470). This process can continue until the data is correctly written in the memory 104 (the controller 102 can manage memory errors without any internal resources).

In some cases, based on the availability of the extended app-based error recovery, the controller 102 (e.g., using its flash translation layer (FTL) module) can dynamically manage its backend routing policy for host writes to disable inefficient program-fail-specific parity protection when the controller 102 determines that the extended recovery is available to compensate for errors during memory programming. Likewise, a system can be provided that uses the application, FTL, and memory verification to bias various policies for optimal resource utilization across the host 300, storage controller 102, device cache, and memory 104 for given quality-of-service (QoS) and data recovery capabilities.

The following paragraphs describe example ways in which data can be backed up in a host cache. It should be understood that these are merely examples and that other implementations can be used. In one example, host-to-data-storage-device communication is via the dedicated application. That is, writes and reads or any communication between the host 300 and the data storage device 100 will be through the application only. Internal to the data storage device 100, the secondary backup blocks can be removed, and the controller 102 can set a limit for the data to be cached. This limit can depend on the data verification to write offset margin present in the data storage device 100.

Whenever the host 300 transfers data to the data storage device 100, the application can ensure that the amount of data defined by the limit set by the controller 102 will be cached in the host's internal volatile memory (e.g., RAM). This data can be refreshed in a first-in-first-out (FIFO) manner for every write, such that the last-written data has a backup in the host cache. Whenever a memory failure is observed in the data storage device 100 during data verification, the data corresponding to this failure location can be fetched from the host's cache memory and re-written to the data storage device 100. The older failing data can be invalidated, and the same data can be committed from this new location.

Figure 5:
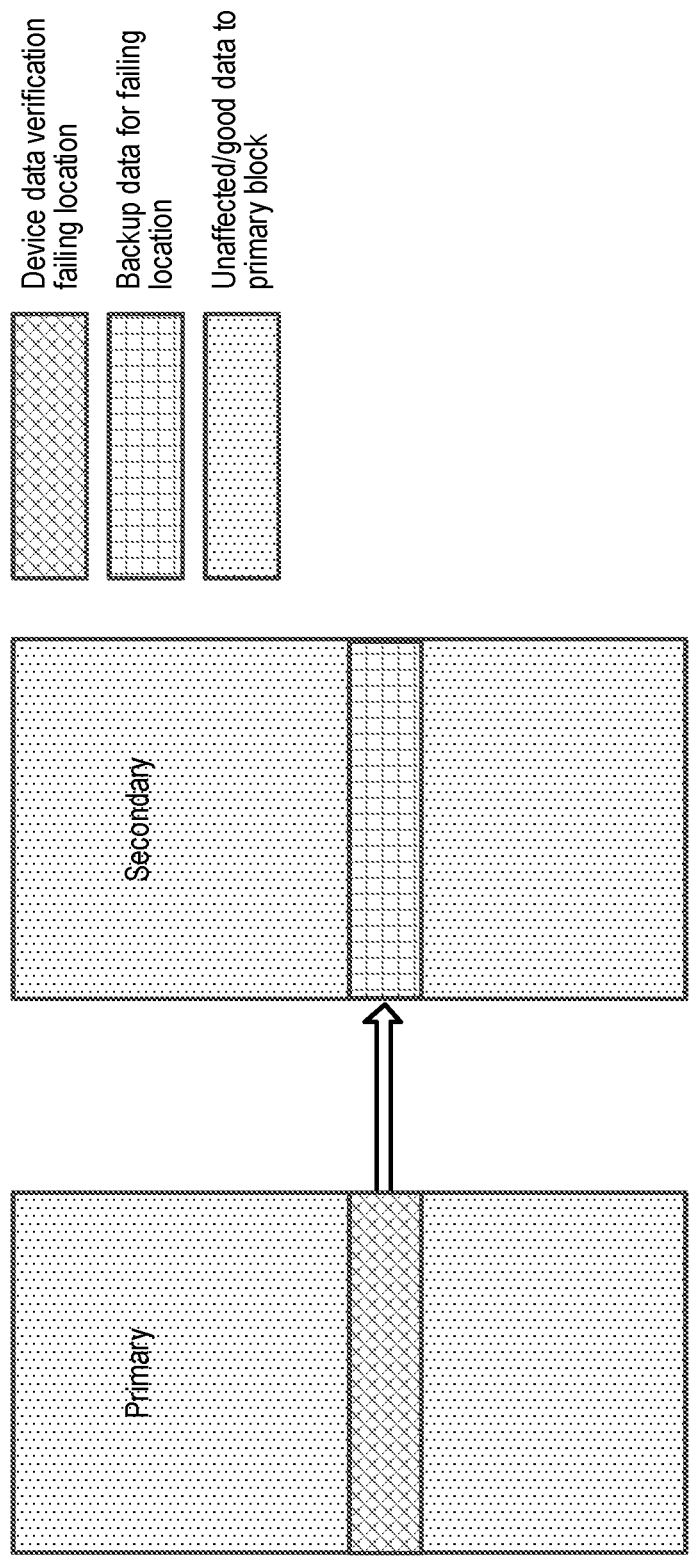
FIG. 5 is an illustration of a dual-write method of an embodiment.
Figure 6:
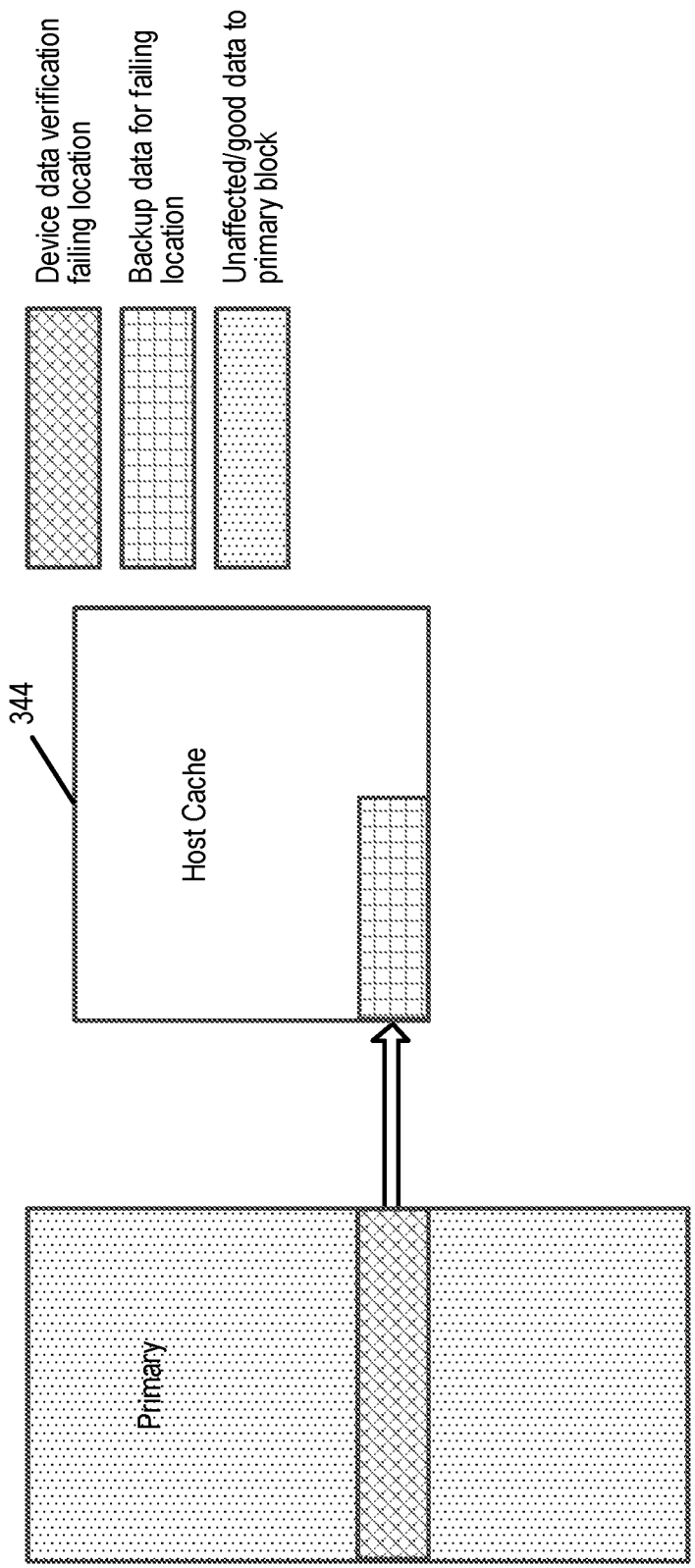
FIG. 6 is an illustration of a method of an embodiment for application-defined extended data recovery.

FIGS. 5 and 6 illustrate an advantage of these embodiments. FIG. 5 shows the use of a secondary block in the memory 104 of the data storage device 100 to store a backup copy of the data, whereas FIG. 6 shows that the use of the secondary block in the memory 104 of the data storage device 100 can be eliminated by storing the backup copy of the data in the cache 344 in the host 300. Removing the need for secondary backup in data storage device 100 can improve overall performance and yield. Further, these embodiments can provide better performance and yield improvement with higher memory nodes. This embodiment may be particularly desired in low-cost data storage devices in a retail setting, which can be less reliable, or even in some enterprise settings where a customer wants to save cost.

As mentioned above, several alternatives can be used. As another alternative, the host 300 can hold onto the write commands until backend verification. In this alternative, the host driver can cache an amount of write commands associated with an accumulated data size as per a backend verification requirement; and the existing driver can be modified to take care of the new flow, which can include holding those many commands as per the device request. Back and forth communication can be set up to indicate that the backend has successfully verified the data in the memory 104. Also, as mentioned above, a driver can abstract the existing storage driver, so that the legacy driver can continue to work as it is, and a new module in the driver can take care of caching according to the specific requirements of the data storage device 100. Any loss in the new driver module (following the host driver module) can mean a loss in the storage device itself. This can be considered on par with an ungraceful shutdown (UGSD) flow where the data in volatile cache of the data storage device is lost. Data can be remembered on the host end (in the new driver) based logical block addresses (LBAs). In case of a host power loss scenario, the data may be in the host cache, and memory errors occurring in the data storage device 100 for the same data may not be recovered.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two-dimensional memory structure or a three-dimensional memory structure.

In a two-dimensional memory structure, the semiconductor memory elements are arranged in a single plane or a single memory device level. Typically, in a two-dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three-dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three-dimensional memory structure may be vertically arranged as a stack of multiple two-dimensional memory device levels. As another non-limiting example, a three-dimensional memory array may be arranged as multiple vertical columns (e.g., columns extending substantially perpendicular to the major surface of the substrate, i.e., in the y direction) with each column having multiple memory elements in each column. The columns may be arranged in a two-dimensional configuration, e.g., in an x-z plane, resulting in a three-dimensional arrangement of memory elements with elements on multiple vertically stacked memory planes. Other configurations of memory elements in three dimensions can also constitute a three-dimensional memory array.

By way of non-limiting example, in a three-dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three-dimensional configurations can be envisioned wherein some NAND strings contain memory elements in a single memory level while other strings contain memory elements which span through multiple memory levels. Three-dimensional memory arrays may also be designed in a NOR configuration and in a ReRAM configuration.

Typically, in a monolithic three-dimensional memory array, one or more memory device levels are formed above a single substrate. Optionally, the monolithic three-dimensional memory array may also have one or more memory layers at least partially within the single substrate. As a non-limiting example, the substrate may include a semiconductor such as silicon. In a monolithic three-dimensional array, the layers constituting each memory device level of the array are typically formed on the layers of the underlying memory device levels of the array. However, layers of adjacent memory device levels of a monolithic three-dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three-dimensional memory arrays. Further, multiple two-dimensional memory arrays or three-dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three-dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A data storage device comprising:
a memory; and
one or more processors, individually or in combination, configured to:
provide a host with an indication of an amount of data to cache in a memory of the host;
receive, from the host, the amount of data for storage in the memory of the data storage device, wherein the host is configured to cache the amount of data in the memory of the host as a secondary copy; and
write only a single copy of the amount of data in the memory of the data storage device, wherein the secondary copy stored in the memory in the host is available in an event of a failure to correctly write the single copy in the memory of the data storage device.

2. The data storage device of claim 1, wherein the indication comprises a data size of a write verification process.

3. The data storage device of claim 1, wherein the indication is based on a margin of the data storage device, a quality-of service requirement, a memory node, a memory configuration, and/or a backend need of the data storage device.

4. The data storage device of claim 1, wherein the one or more processors, individually or in combination, are further configured to provide the host with computer-readable program instructions that, when executed by the host, provide an application configured to receive the indication from the data storage device and cause the amount of data to be cached.

5. The data storage device of claim 1, wherein the one or more processors, individually or in combination, are further configured to provide the host with computer-readable program instructions for a driver that is configured to receive the indication from the data storage device and cause the amount of data to be cached.

6. The data storage device of claim 1, wherein the one or more processors, individually or in combination, are further configured to dynamically change the amount of data to cache in the memory of the host.

7. The data storage device of claim 1, wherein the one or more processors, individually or in combination, are further configured to disable program-fail-specific parity protection in response to the host caching the amount of data in the memory of the host as the secondary copy.

8. The data storage device of claim 1, wherein the host is further configured to refresh the cached amount of data in a first-in-first-out (FIFO) manner for every write, such that last-written data is backed up.

9. The data storage device of claim 1, wherein the memory in the data storage device comprises a three-dimensional memory.

10. A non-transitory computer-readable medium storing program instructions that, when executed by one or more processors in a host in communication with a data storage device, cause the one or more processors, individually or in combination, to perform functions comprising:
receiving, from the data storage device, an indication of how much data to cache in a memory of the host;
sending, to the data storage device, data to store in a memory in the data storage device;
caching an amount of the data in the memory in the host per the indication;
receiving, from the data storage device, a notification of a failure in writing the data in the memory of the data storage device; and
in response to receiving the notification, sending, to the data storage device, the data cached in the memory in the host.

11. The non-transitory computer-readable medium of claim 10, wherein the indication is based on a data size of a write verification process.

12. The non-transitory computer-readable medium of claim 10, wherein the indication is based on a margin of the data storage device, a quality-of service requirement, a memory node, a memory configuration, and/or a backend need of the data storage device.

13. The non-transitory computer-readable medium of claim 10, wherein the program instructions are for an application.

14. The non-transitory computer-readable medium of claim 10, wherein the program instructions are for a driver.

15. The non-transitory computer-readable medium of claim 10, wherein the indication is dynamically changeable by the data storage device.

16. The non-transitory computer-readable medium of claim 10, further comprising additional program instructions that, when executed by the one or more processors in the host, cause the one or more processors, individually or in combination, to disable parity protection.

17. The non-transitory computer-readable medium of claim 10, further comprising additional program instructions that, when executed by the one or more processors in the host, cause the one or more processors, individually or in combination, to refresh the cached amount of data in a first-in-first-out (FIFO) manner.

18. The non-transitory computer-readable medium of claim 10, wherein:
the non-transitory computer-readable medium is in the host; and
the program instructions are provided to the non-transitory computer-readable medium from the data storage device.

19. The non-transitory computer-readable medium of claim 10, wherein the memory in the data storage device comprises a three-dimensional memory.

20. A data storage device comprising:
a memory; and
means for enabling a host to store a secondary copy of data in host memory to eliminate a need to store the secondary copy of the data in the memory of the data storage device by providing the host with an indication of an amount of data to cache in the memory of the host.

* * * * *